United States Patent [19]

Cheng

[11] Patent Number: 5,645,293
[45] Date of Patent: Jul. 8, 1997

[54] COLLAPSIBLE STRUCTURE FOR A STROLLER

[76] Inventor: Ying-Hsiung Cheng, No. 14, Lane 477, Chung Shan Road, Jen Te Hsiang, Tainan Hsien, Taiwan

[21] Appl. No.: 508,681

[22] Filed: Jul. 28, 1995

[51] Int. Cl.⁶ ............................................. B62B 7/06
[52] U.S. Cl. .................... 280/642; 280/658; 280/47.36; 280/650
[58] Field of Search ...................... 280/642, 647, 280/650, 658, 47.36, 47.371, 47.38, 87.051

[56] References Cited

U.S. PATENT DOCUMENTS

| | | | |
|---|---|---|---|
| 4,564,212 | 1/1986 | Orlandino et al. | 280/642 |
| 4,632,421 | 12/1986 | Shamie | 280/650 |
| 4,848,787 | 7/1989 | Kassai | 280/642 |
| 5,257,799 | 11/1993 | Cone et al. | 280/47.36 |
| 5,427,402 | 6/1995 | Huang | 280/642 |
| 5,454,584 | 10/1995 | Haut et al. | 280/642 |
| 5,478,102 | 12/1995 | Haung | 280/650 |
| 5,513,864 | 5/1996 | Huang | 280/47.36 |

*Primary Examiner*—Brian L. Johnson
*Assistant Examiner*—Min Yu
*Attorney, Agent, or Firm*—Morton J. Rosenberg; David I. Klein

[57] ABSTRACT

A collapsible structure for a stroller includes a main connect base fixed on each of two front wheel rod, and an auxiliary connect base is fixed on each of two rear wheel rod. A push ring is provided on each of two push rods being pressed to move down to push down the two push rods and two connecting rods so as to collape and spread a stroller, or to change the position of a push handle for pushing and moving the stroller forward or backward.

1 Claim, 7 Drawing Sheets

COLLAPSIBLE STRUCTURE FOR A STROLLER

BACKGROUND OF THE INVENTION

This invention concerns a collapsible structure for a stroller, particularly having a push ring movably fitted on a push rod to dirctly collapse and spread a stroller or change pushing direction of the stroller.

A conventional known new stroller shown in FIG. 9 includes two front wheel rods 11, two rear wheel rods 12, a U-shaped bed frame 14 fixed between the front and the rear wheel rods 11, 12, two front wheels 111 and two rear wheels 121, a main base 21 of a collapsible structure for collapsing fixed on top of each of the front and the rear wheele, an auxiliary base 22 pivotally connected with the auxiliary base 22. The auxiliary base 22 is connected with a push handle 15 at an upper end, a shade frame 16 supporting a sunshade 17 and pivotally connected between the bed frame 14 and the auxiliary base 22, and a bed 18 supported by the U-shaped bed frame 14. The auxiliary base 22 of the collapsible structure 2 has a push block 23 movable in its interior and urged by a spring 24, forcing a projection 231 of the push block 23 to extend to engage in a tubular hole of the main base 21 to combine the main base and the auxiliary base together.

However, though the conventional shown stroller is convenient for a baby to lie thereon and can be collapsed to a small size for putting away, it is found to have disadvantages as follows:

1. The push block 23 has to be pushed up in collapsing, forcing the projection 231 to retreat inside to separate the main base from the auxiliary base. A mother having a high body may bend down at a position behind the stroller to operate it, but a mother having a short body has to go to the front of the stroller and besides, has to push up the block 23 with a large force and to hold the front wheels securely lest the front portion of the stroller should move up, to an annoying inconvenience.
2. A stroller is pushed to move forward generally, so a baby lying on the bed always looks forward as a user does in pushing to move it, not so convenient to keep watching the baby in moving.

SUMMARY OF THE INVENTION

This invention has been devised to offer a collapsible structure for a stroller, able to allow a stroller spread and collapsed, and the push handle changed in its position so as to push the stroller forward or backward.

A main feature fo the present invention is provision of a main connect base, an auxiliary connect base combined together or separated from each other by operating a push ring fitted around a push rod, and a connecting rod connected with the push ring to move down together to move a base movably combined with the main and the auxiliary connect base so that the main connect base may be assembled together for spreading the stroller or disassembled from each other for collapsing the stroller, and a push handle fixed with the push rod may be moved from a back position to a front position or vice versa to push the stroller forward or backward.

BRIEF DESCRIPTION OF DRAWINGS

The invention will be better understood by reference to the accompanying drawings, wherein.

DETAILED DESCRIPTION OF THE INVENTION

Figure 1:
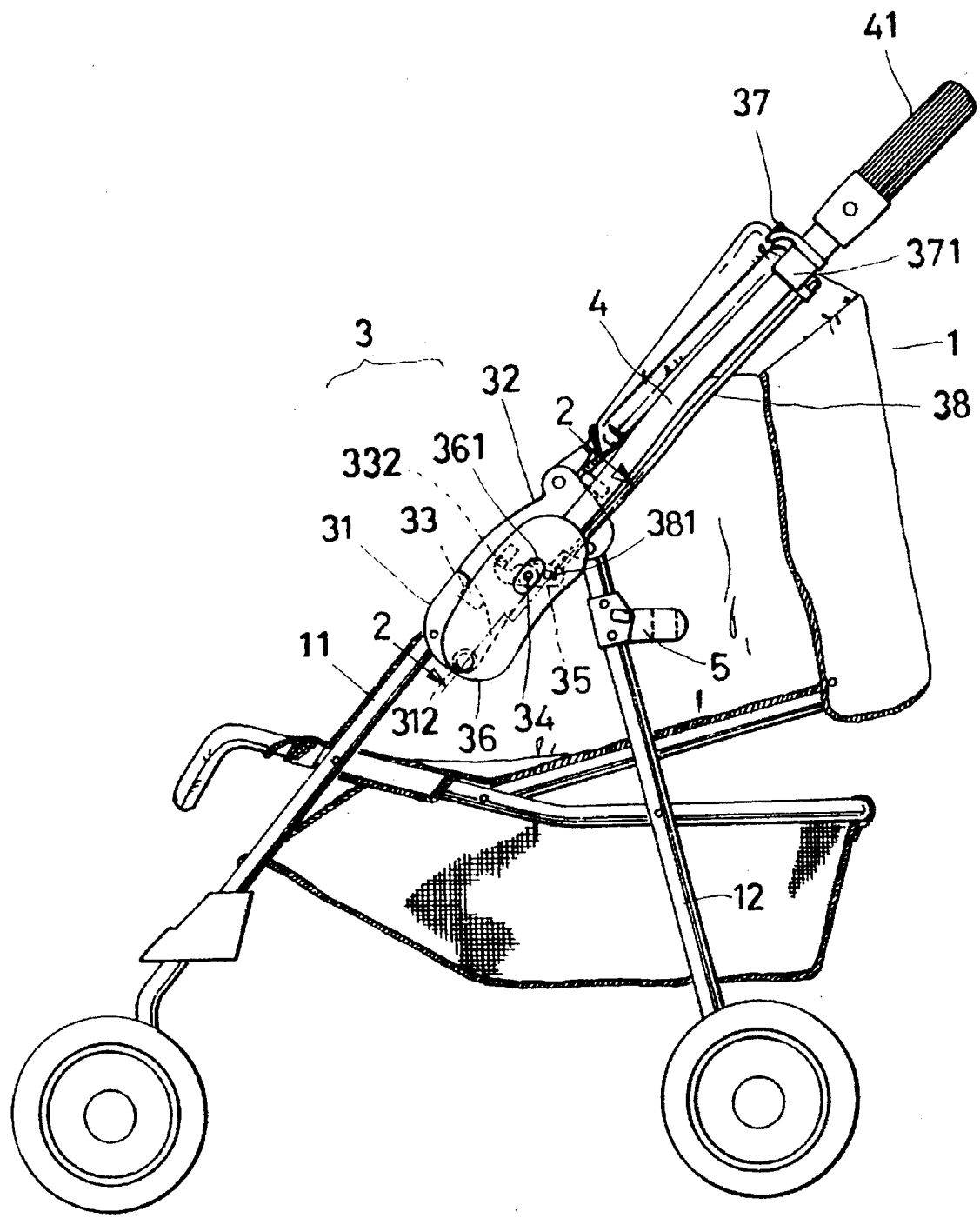
FIG. 1 is a perspective view of a collapsible structure for a stroller in the present invention.

A collapsible structure 3 for a stroller 1 in the present invention, as shown in FIGS. 1, 2, 3, and 4, includes a main connect base 31 fixed on a front wheel rod 11, and an auxiliary connect base 32 fixed on a rear wheel rod 12. The auxiliary connect base 32 has an insert block 33 in its interior resiliently urged by a spring 331, and the insert block 33 is inserted in a cavity 311 of the main connect base 31. A pin 34 protrudes sidewise and orderly through the auxiliary connect base 32, a hook plate 35, a rectangular hole 361 of a base 36 and a push rod 4, pivotally connecting them together. The hook plate 35 can hook to move a projecting member 332 of the insert block 33, and the base 36 has a recess 362 in one end to engage with a hook block 312 of the main connect base 31.

An elongate push rod 4 is provided to have its lower end movably fitted in a tubular hole 363 of the base 36, and a pusher 37 is fixed with a sleeve 371 fitted around an upper portion of the push rod 4 near the lower end of a push bandle 41. A connecting rod 38 is provided, having its upper end fixed with the sleeve 371 and its lower end extending in the base 36, and a lower bent end 381 resiliently urged by a spring 382 and protruding in a rectangular hole 361 of the base 36 and a rectangular hole 351 of the hook plate 351. The base 36 has a recess 364 along tubular hole 363, and a spring 365 received in the recess 364 for urging a stop 42 provided sidewise on the push rod 4.

Figure 2:
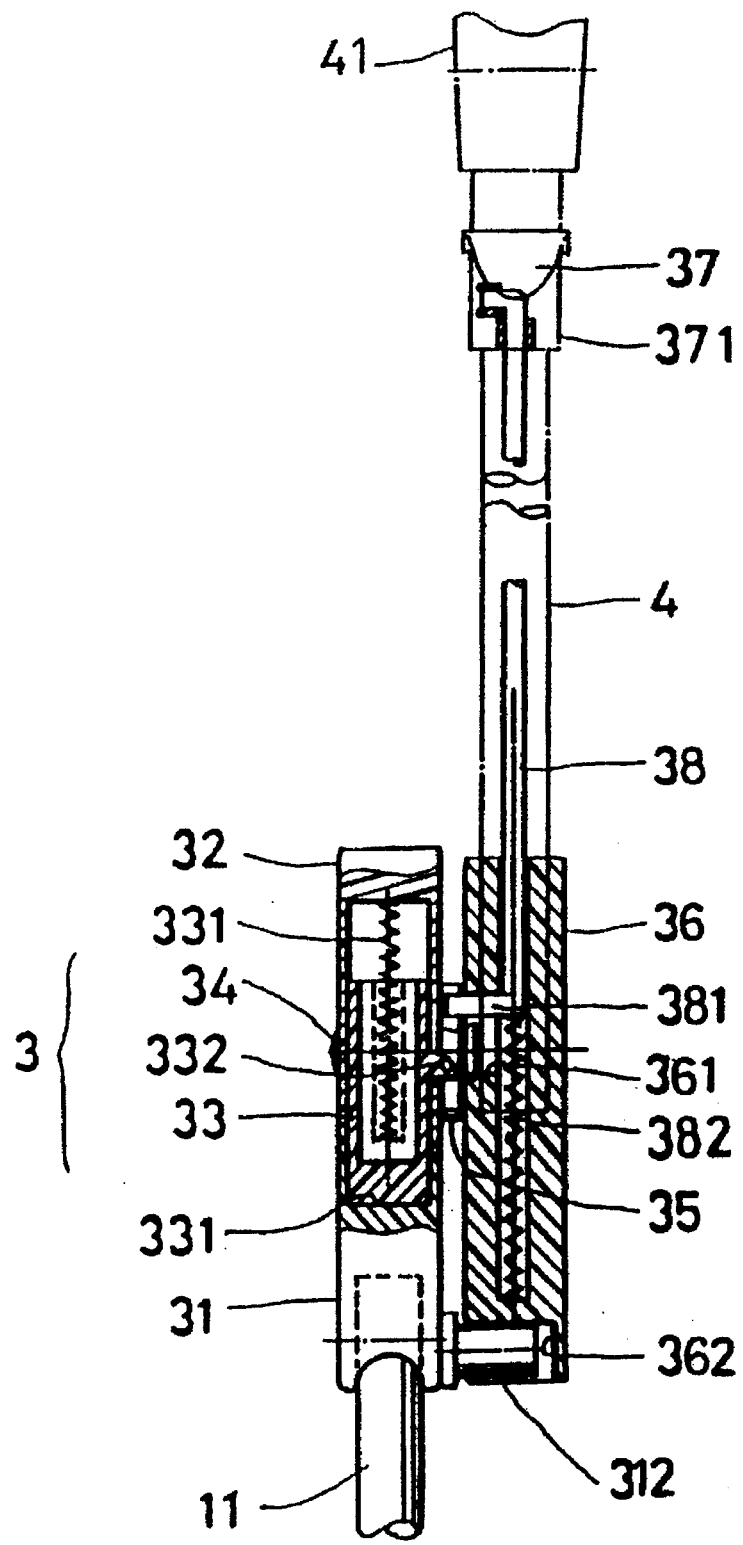
FIG. 2 is a cross-sectional view of the collapsible structure in the present invention, taken along the sectional line 2—2 of FIG. 1.
Figure 4:
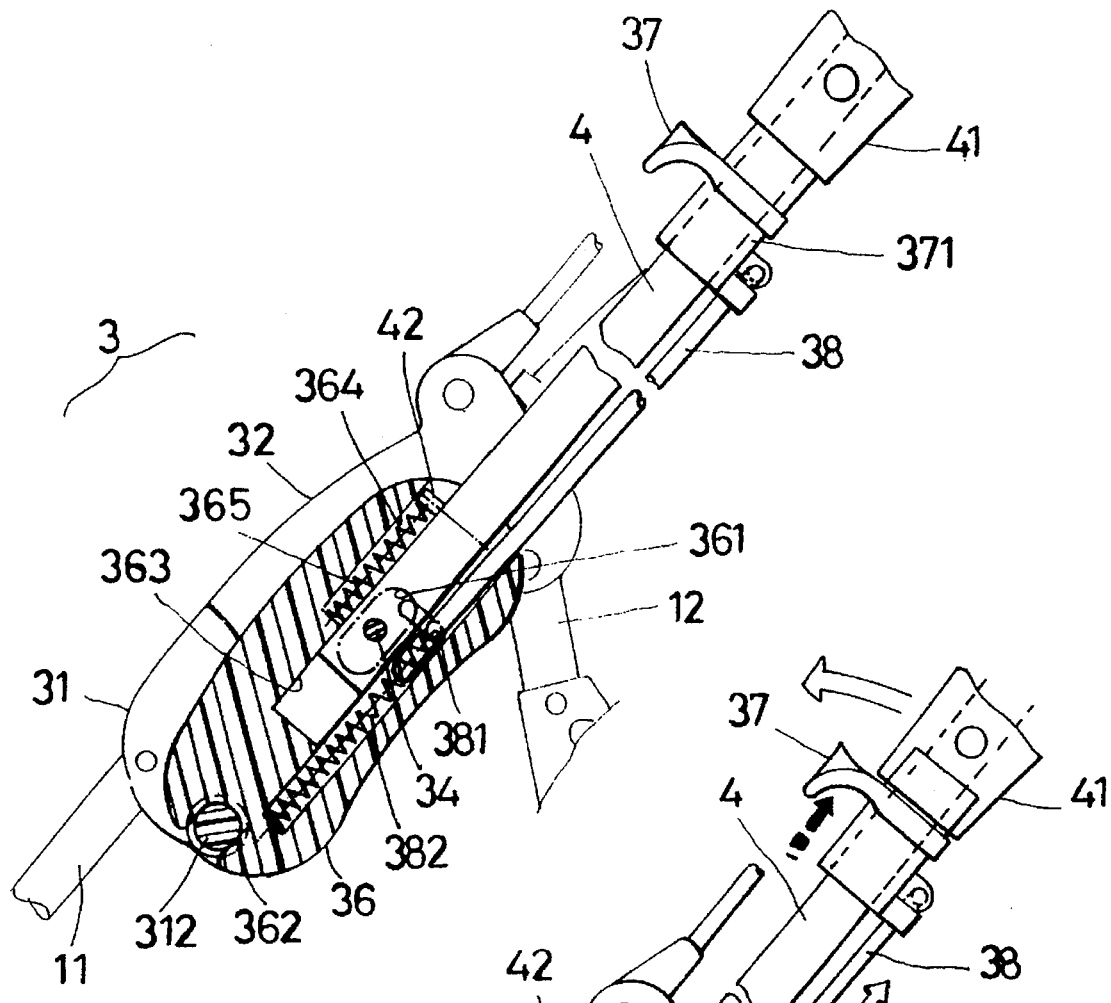
FIG. 4 is a side view of the collapsible structure for a stroller in the present invention.
Figure 5:
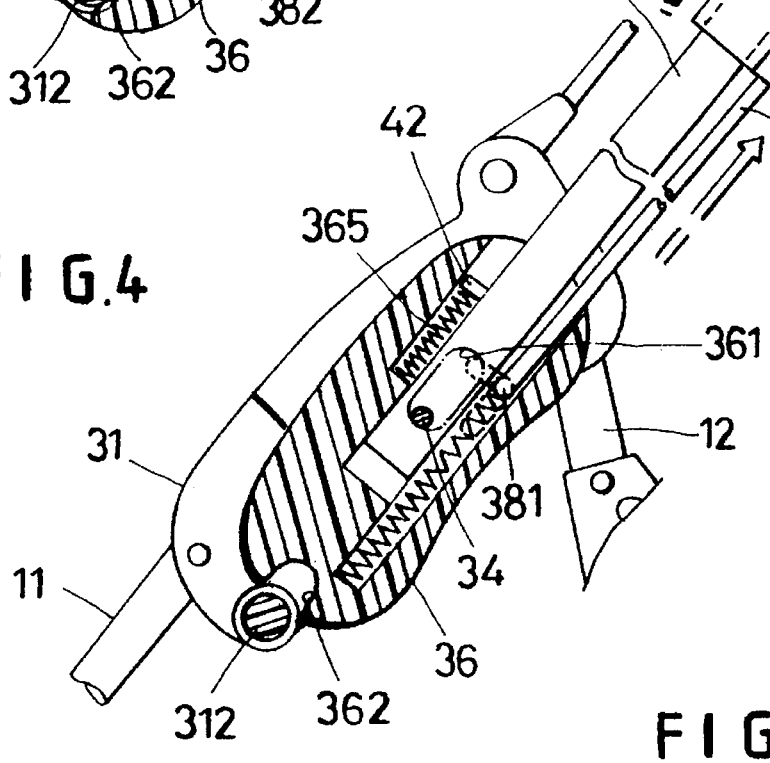
FIG. 5 is a side view of the collapsible structure for a stroller in the present invention, showing how to change the position of a push rod.
Figure 6:
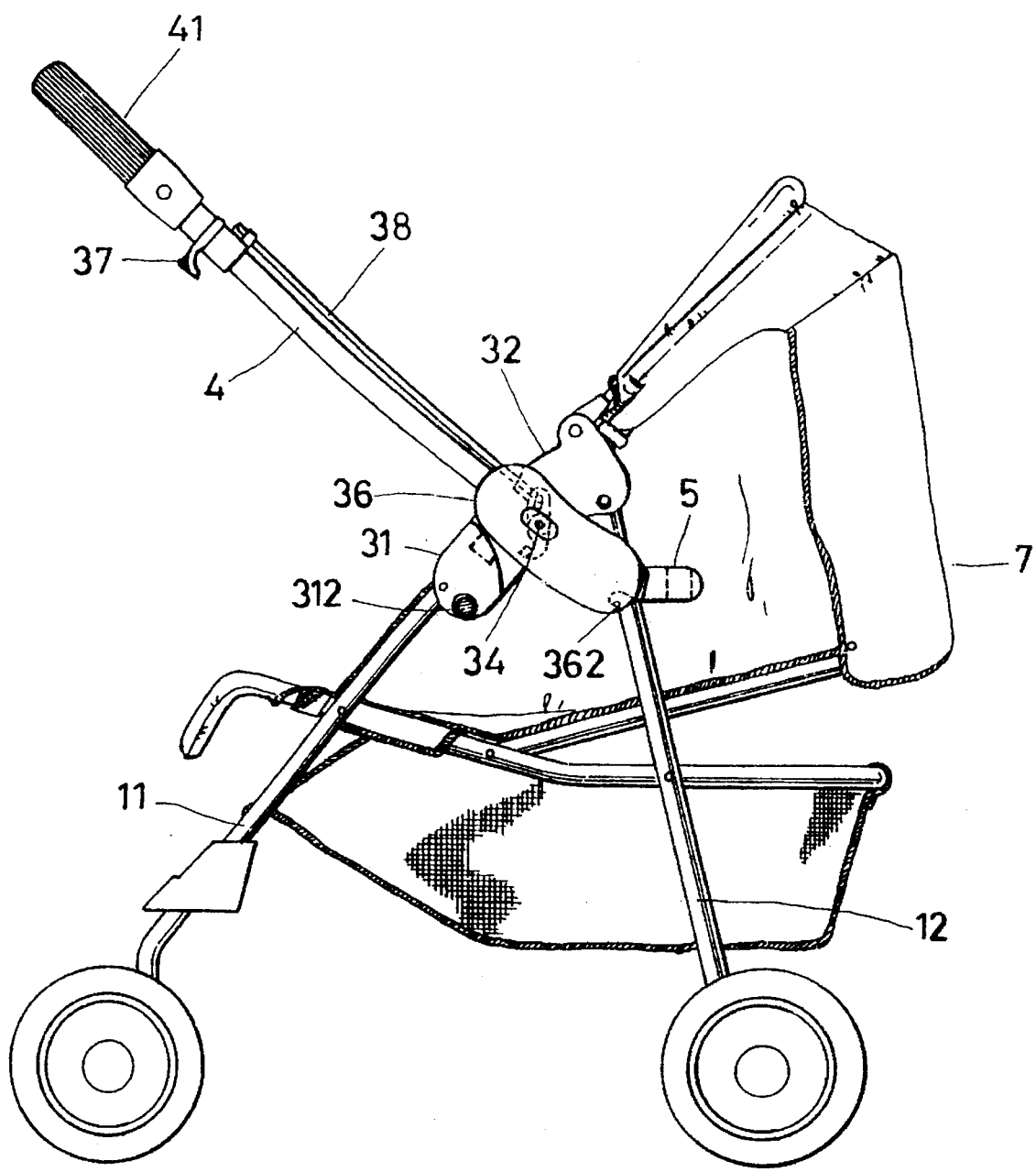
FIG. 6 is a prespective view of a stroller with the push rod changed in its position.

In using, referring to FIG. 1, the main connect base 31 and the auxiliary connect base 32 enable a stroller to be spread to be used as a common stroller, but also the push handle 41 can be changed in its position, as shown in FIGS. 2, 4 and 5, by pulling up the two pushers 37, 37 below the push handle 41 to pull the connecting rod 38, which then moves up the lower bent end 381 of the connecting rod 38. Then the whole base 36 is raised up by the lower bent end 381, being freed with the recess 362 separated from the hook block 312. Therefore, the push handle 41 together with the push rod 4 can be moved to the front of the stroller 1, as shown in FIG. 6, so as to push the stroller 1 to move backward instead of forward, and a mother can face to her baby in pushing the stroller.

Figure 3:
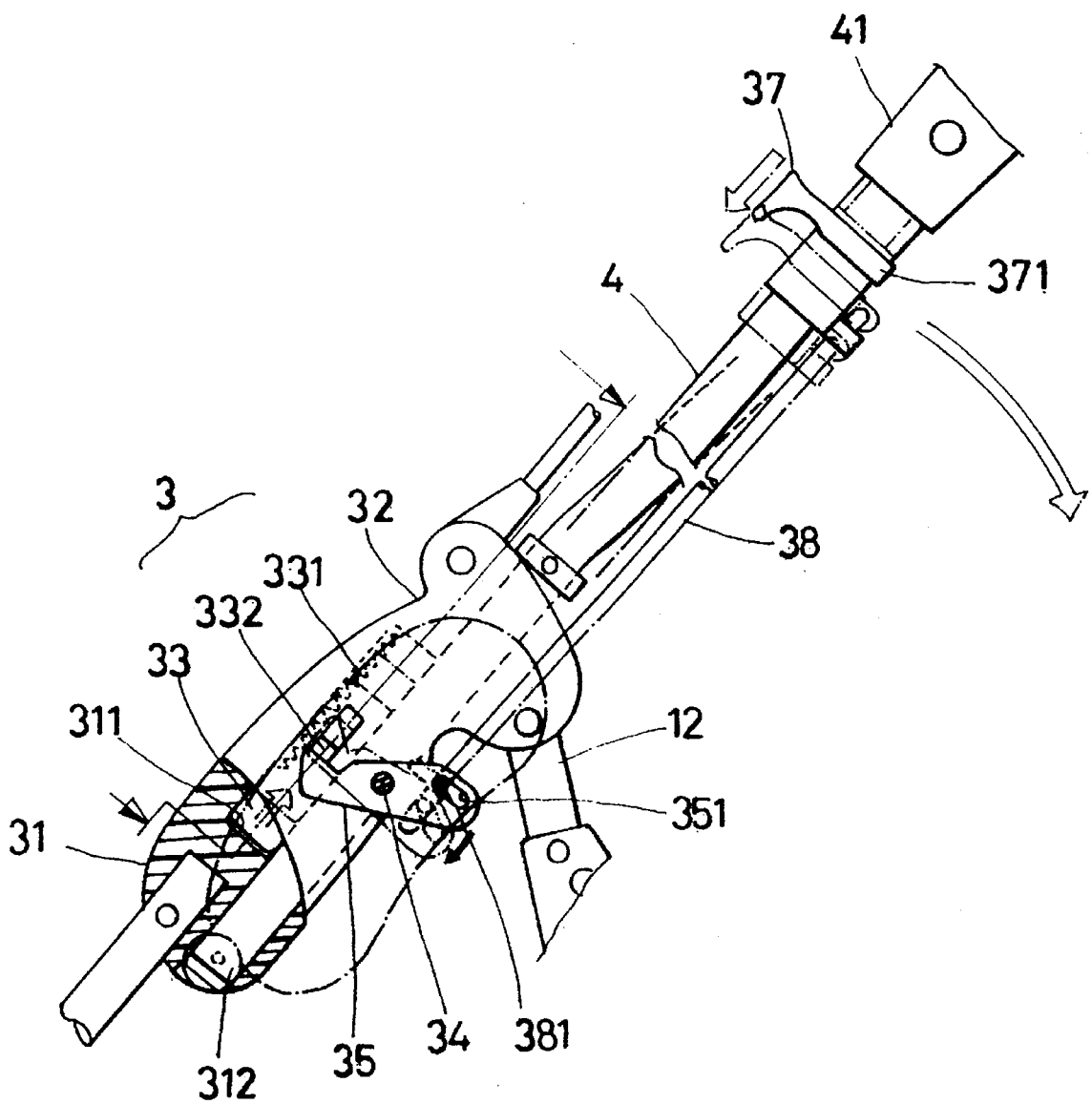
FIG. 3 is a perspective view of the collapsible structure in the present invention, showing it being collapsed.
Figures 7, 8:
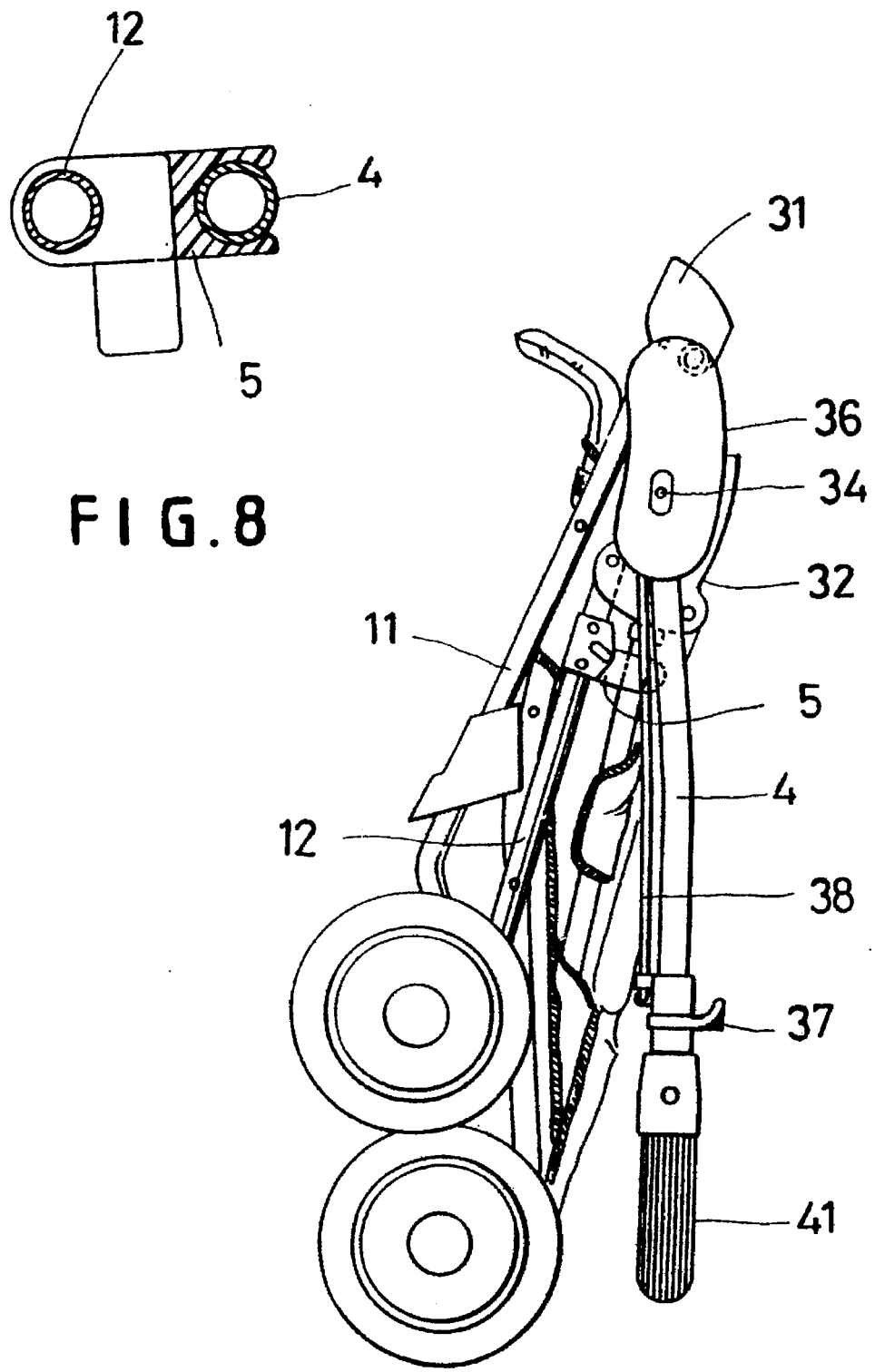
FIG. 7 is a perspective view of a stroller with the collapsible sturcture in the present invention, showing it already collapsed.
FIG. 8 is a cross-sectional view of a tube holder in the present invention; and, FIG. 9 is a side view of a conventional known stroller.
Figure 9:
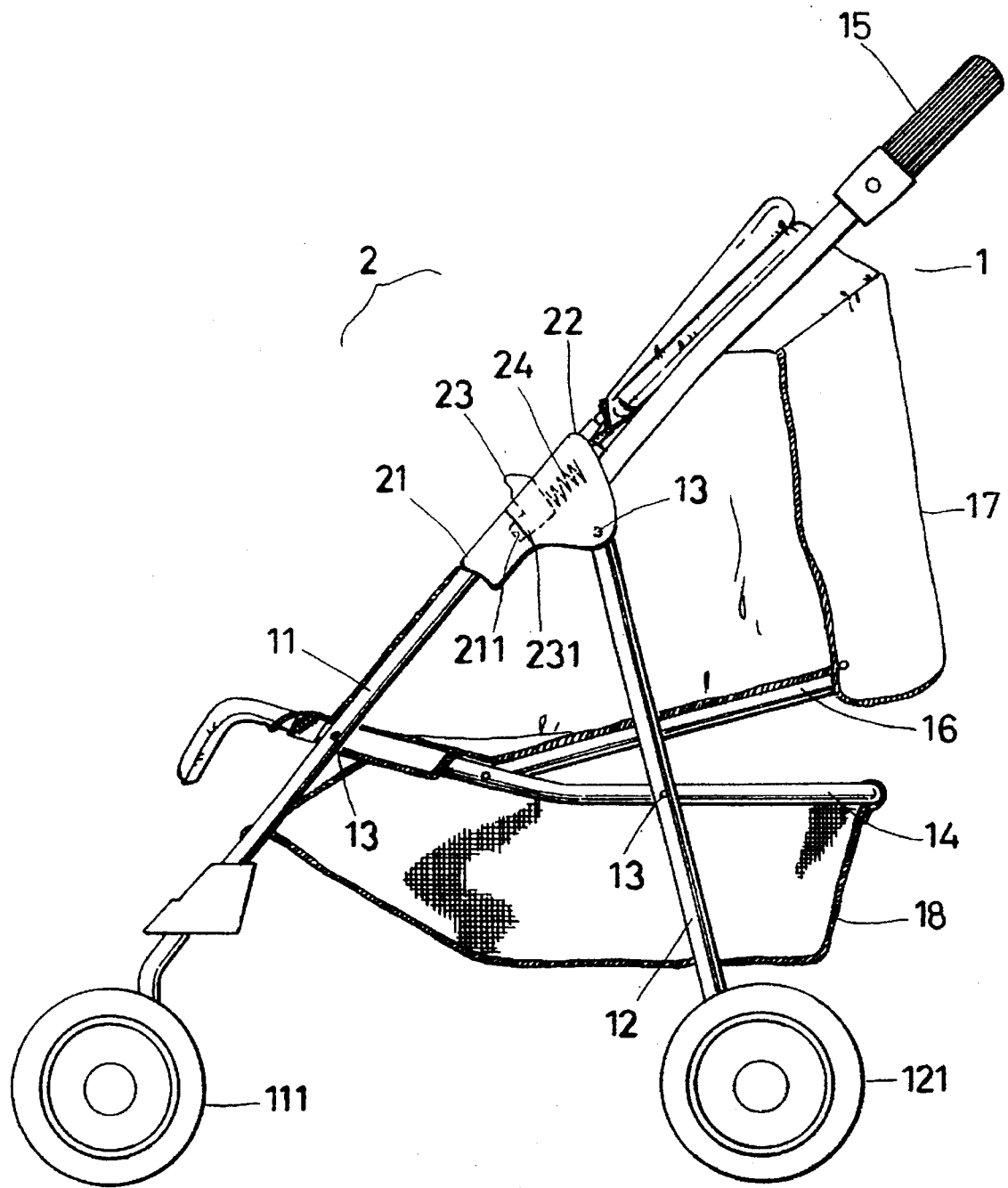

If the stroller 1 is to be collapsed, referring to FIGS. 3 and 7, the pusher 37, 37 are to be pushed down, forcing the hook plate 35 function like a lever via the connecting rod 38 to let the other end of the hook plate 35 push up the projecting member 332, which forces the insert block 33 separate from the cavity 311 and then the main connect base 31 separates from the auxiliary base 32 to allow the stroller 1 collapsed to the shape shown in FIG. 7.

A tube holder 5 may be provided at a proper point of the rear wheel rod 12, as shown in FIG. 8, for securing the push rod 4 after the stroller 1 is collapsed.

The present invention, an improved collapsible structure for a stroller, is considered to have advantages as follows:

1. It permits the push handle of a stroller to be changed in the position so that the stroller can be moved forward or backward, and consequently a user can push the stroller and watch a baby lying thereon at the same time.
2. Whether spreading or collapsing a stroller or changing the position of the push handle is simply effected by operating the two pushers at both sides of the push handle, which needs only a little force to attain the object.

While the preferred embodiments of the invention have been described above, it will be recognized and understood that various modifications may be made therein and the appended claims are intended to cover all such modifications which may fall within the spirit and scope of the invention.

What is claimed is:

1. A collapsible structure for a stroller comprising:

a pair of front wheel rods displaced from one another in a lateral direction, each of said front wheel rods having a top end;

a main connect base coupled to each said top end of each said front wheel rod, said main connect base having a cavity formed in an upper end thereof and a hook block projecting in said lateral direction from a lower end thereof;

a pair of rear wheel rods each having a top end;

an auxiliary connect base coupled to each said top end of each said rear wheel rod for detachable coupling to said upper end of said main connect base, said auxiliary connect base having a retractable insert block extending therefrom for locking and unlocking said auxiliary connect base to said main connect base, said auxiliary connect base including a first spring for biasing said insert block into an extended position for insertion of said insert block into said cavity formed in said upper end of said main connect base, said insert block having formed thereon a projecting member extending in said lateral direction;

an elongate pivot pin extending through said auxiliary connect base in said lateral direction;

a base pivotally coupled to said pivot pin, said base having a recess formed in a lower end thereof for releasable coupling to said hook block projecting from said main connect base, said base having formed therein an elongate tubular cavity extending in a transverse direction and a first and a second recess positioned along said tubular cavity, said base having a side with a rectangular hole formed therethrough;

an elongate push rod pivotally coupled to said pivot pin, said push rod having an upper end with a push handle fixed thereto and a lower end for slidable insertion into said elongate tubular cavity formed in said base, said lower end including a projecting stop for slidable insertion into said first recess formed in said base, said first recess including a second spring abutting said projecting stop for providing a resilient bias between said push rod and said base;

a sleeve having a push ring formed thereon, said sleeve being slidably mounted on said upper end of said push rod for coupling to an upper end of a connecting rod, said connecting rod having a lower end for slidable insertion into said second recess formed in said base, said lower end of said connecting rod being coupled to one end of a third spring, said third spring having an opposing end fixed to said base for providing a resilient bias between said connecting rod and said base, said lower end of said connecting rod having formed thereon a bent end extending laterally through said rectangular hole formed through said side of said base;

a hook plate positioned between said auxiliary connect base and said base and pivotally coupled to said pivot pin, said hook plate having a first end coupled to said bent end of said connecting rod and a second end disposed proximal to said projecting member of said insert block;

whereby the stroller is rotatively repositioned about said pivot pin by an upward transverse displacement of said push ring, said upward transverse displacement causing said bent end of said connecting rod to engage and correspondingly displace said base, said corresponding displacement of said base disengaging said recess of said base from said hook block, and whereby said push rod of the stroller is collapsed by a downward transverse displacement of said push ring, said downward transverse displacement causing a corresponding pivotal displacement of said second end of said hook plate, said second end of said hook plate engaging said projecting member of said insert block and forcing said insert block into a retracted position within said auxiliary connect base responsive to said pivotal displacement.

* * * * *